United States Patent [19]

Jamieson

[11] Patent Number: 5,345,042
[45] Date of Patent: Sep. 6, 1994

[54] ELEVATOR HITCH LOAD WEIGHING TARE COMPENSATION

[75] Inventor: Eric K. Jamieson, Farmington, Conn.

[73] Assignee: Otis Elevator Company, Farmington, Conn.

[21] Appl. No.: 891,491

[22] Filed: May 29, 1992

[51] Int. Cl.⁵ .......................... G01G 13/14; B66B 3/00
[52] U.S. Cl. .......................................... 177/165; 177/1;
    177/3; 177/6; 177/25.13; 177/25.19; 177/50;
    177/164; 177/132; 187/133
[58] Field of Search .................. 177/1, 3, 6, 25.13,
    177/25.19, 50, 164, 165, 132; 187/133

[56] References Cited

U.S. PATENT DOCUMENTS

| | | | |
|---|---|---|---|
| 3,659,665 | 5/1972 | Godwin et al. | 177/1 |
| 4,117,898 | 10/1978 | Moriyama | 177/165 |
| 4,181,946 | 1/1980 | Loshbough et al. | 177/25.13 |
| 4,330,836 | 5/1982 | Donofrio et al. | 364/567 |
| 4,549,620 | 10/1985 | Dee et al. | 177/60 |
| 4,573,542 | 3/1986 | Schlegel et al. | 177/132 |
| 4,630,696 | 12/1986 | Kemnitz | 177/165 |
| 4,648,056 | 3/1987 | Wakefield | 364/567 |
| 4,793,442 | 12/1988 | Heckler et al. | 187/115 |
| 4,939,679 | 7/1990 | David et al. | 364/571.04 |
| 5,119,893 | 6/1992 | Jost | 177/16 |

FOREIGN PATENT DOCUMENTS 2055207  2/1981  United Kingdom ............... 187/133

*Primary Examiner*—Benjamin R. Fuller
*Assistant Examiner*—Randy W. Gibson
*Attorney, Agent, or Firm*—Breffni X. Baggot

[57] ABSTRACT

In an elevator hitch load weighing assembly, a load cell provides an analog load signal to a summer 12, where an analog tare compensation signal is subtracted from the load signal prior to a compensated load signal being provided to an analog-to-digital converter (ADC) 20; the digital load signal is provided to a remaining tare subtractor 26 where tare remaining in the digital load signal is subtracted and a payload provided.

9 Claims, 6 Drawing Sheets

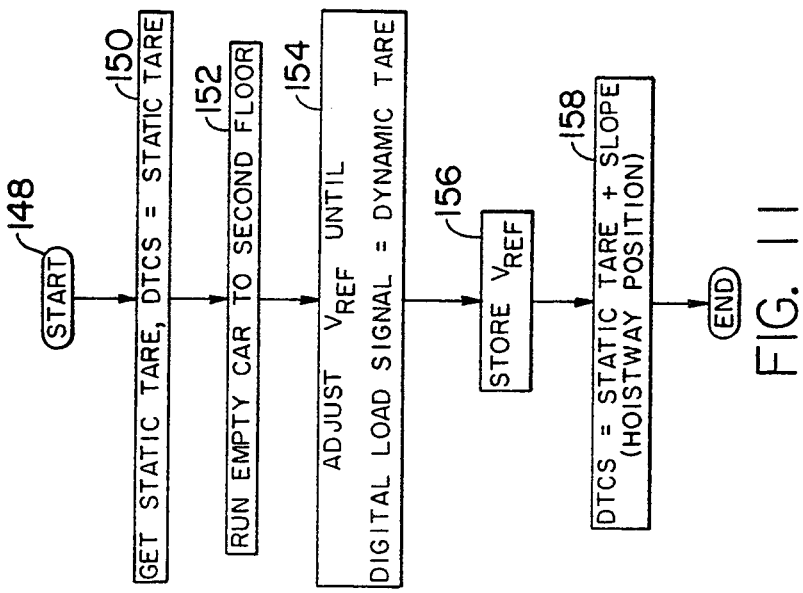
FIG. 11
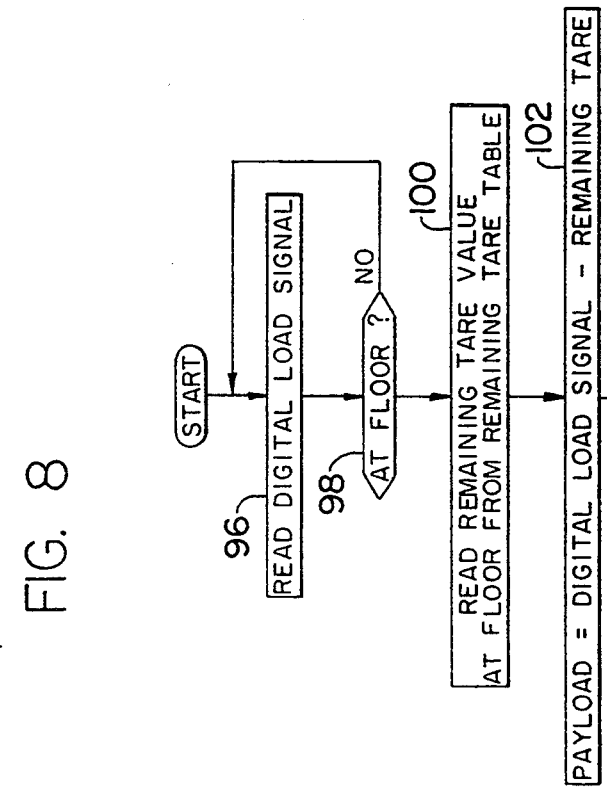
FIG. 8
FIG. 9

5,345,042

ELEVATOR HITCH LOAD WEIGHING TARE COMPENSATION

TECHNICAL FIELD

This invention relates to elevator hitch load weighing.

INCORPORATION BY REFERENCE

Co-pending application Ser. No. 07/891,482 filed May 29, 1992, entitled "Recalibration of Hitch Load Weighing" is herein incorporated by reference.

BACKGROUND OF THE INVENTION

Where an elevator car has hitch load weighing, it is suspended with ropes which pass between two crosshead beams and through holes in a hitch plate. The cab sits on a bottom beam connected to two side beams which are in turn connected to the crosshead beams. When passengers step into the cab, the tension in the ropes increases and causes the hitch plate to bear against the crosshead beams. A single load cell may be sandwiched between the hitch plate and crosshead beams to perform load weighing. Such a hitch load weighing assembly is shown in copending application, Ser. No. 07/792,978, filed Nov. 5, 1991. There, a load cell provides an analog load signal to an analog-to-digital converter (ADC) for converting an analog load voltage into a digital voltage for use by an elevator computer.

Tare is the weight of an empty container that is subtracted from the gross to obtain the net. A problem with hitch load weighing is that the tare is dynamic and varies as a function of car position due to the increasing or decreasing weight of the traveling cable and compensation ropes as the car goes up or down, and the tare at the bottom floor (the static tare) is not the same as the tare at the top floor. The difference in tare from the bottom to the top of the hoistway can be large relative to the weight of the car and the weight of the occupants. To compensate tare, one solution is to convert the analog load signal into a digital signal and compensate the digital signal for tare. This is shown in U.S. Pat. Nos. 4,181,946, "Digital Scale", and 4,630,696, "Apparatus and Method for Automatic System Calibration to Provide Enhanced Resolution in Computerized Weighing Systems".

DISCLOSURE OF THE INVENTION

It is an object of the present invention to compensate tare in a load measurement made at the hitch of an elevator car.

The invention is predicated upon a recognition that normal methods of compensating tare have resolution too poor to allow the weight of a passenger to be resolved from thousands of pounds of total load. For example, where the empty car load at the top of the hoistway is 13,500 pounds and an eight-bit ADC is used, the resolution is 117 pounds per bit, a value large enough so that a person could step into the car and her weight not be detected by the load measuring system.

According to the present invention, in an elevator hitch load weighing assembly, tare is partially eliminated prior to conversion of the analog load signal into a digital load signal and a tare remaining subtractor eliminates tare remaining in the digital load signal for providing a payload signal.

The advantage of the invention is that most of the tare in a load measurement is eliminated prior to conversion of a load signal from analog to a digital signal so that greater resolution of the passenger load is obtained.

BRIEF DESCRIPTION OF THE DRAWINGS

FIG. 8 is a remaining tare table;

FIG. 9 is a logic diagram for subtracting digital stored load signal from a digital load signal;

FIG. 11 shows a flow chart for recalibrating the load weighing system of FIG. 1.

BEST MODE FOR CARRYING OUT THE INVENTION

Tare Compensation

Tare can have three values. Static tare is tare in a load measurement taken when a car 2 (FIG. 4) is at the first floor. Dynamic tare is tare in a load measurement when the car 2 is everywhere else, in the hoistway. The tare which varies as the ascending/descending car carries an increasing/decreasing amount of traveling cable and compensating rope is called the dynamic-tare. Remaining tare is tare left in a compensated load signal (CLS) on a line 18 (FIG. 1) after a first pass at subtracting tare from a load measurement has been made by a partial tare compensator 24 (FIG. 1).

Figure 1:
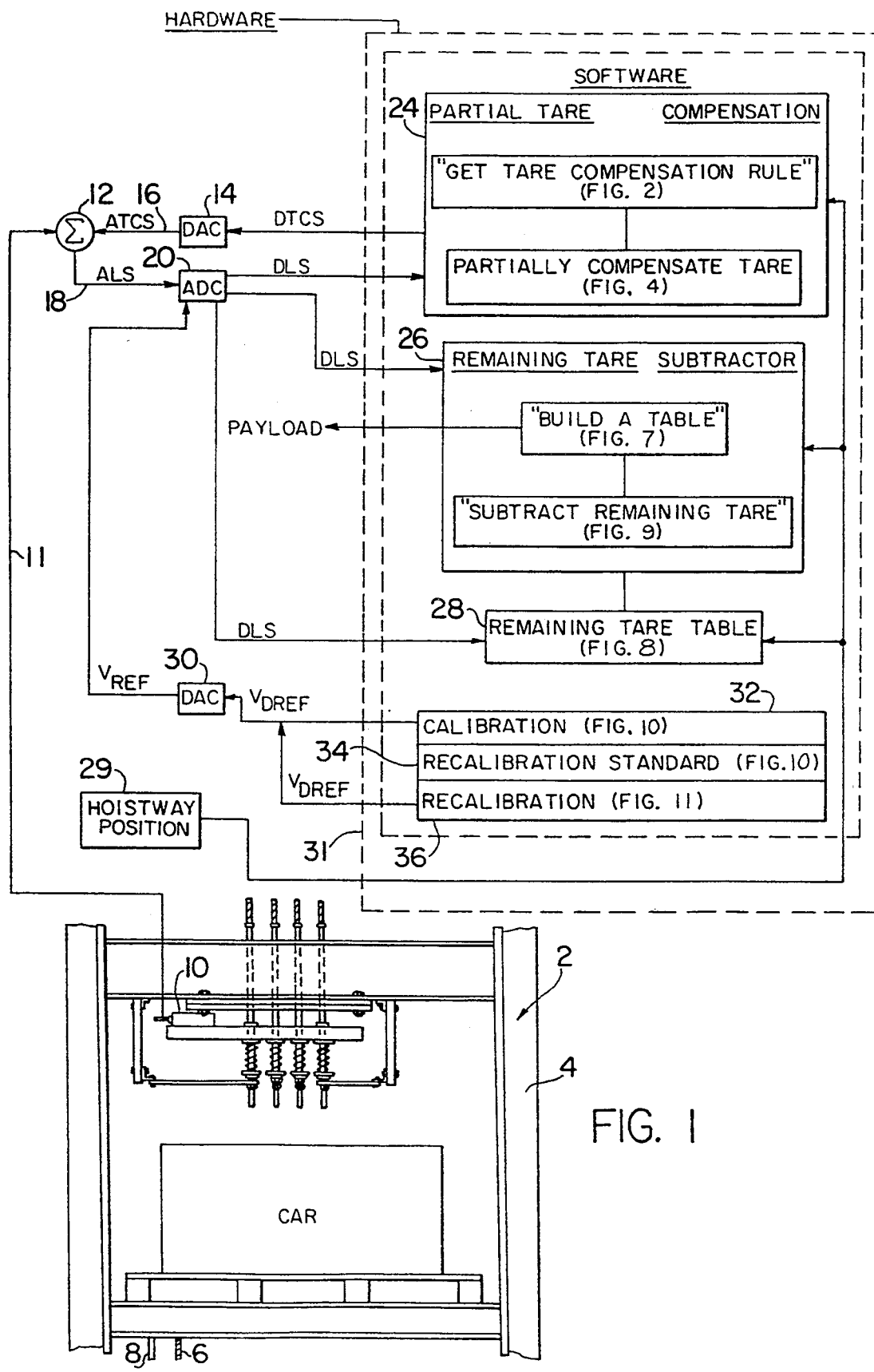
FIG. 1 is a front view of an elevator hitch load weighing assembly with a block diagram illustrating the invention.
Figure 4:
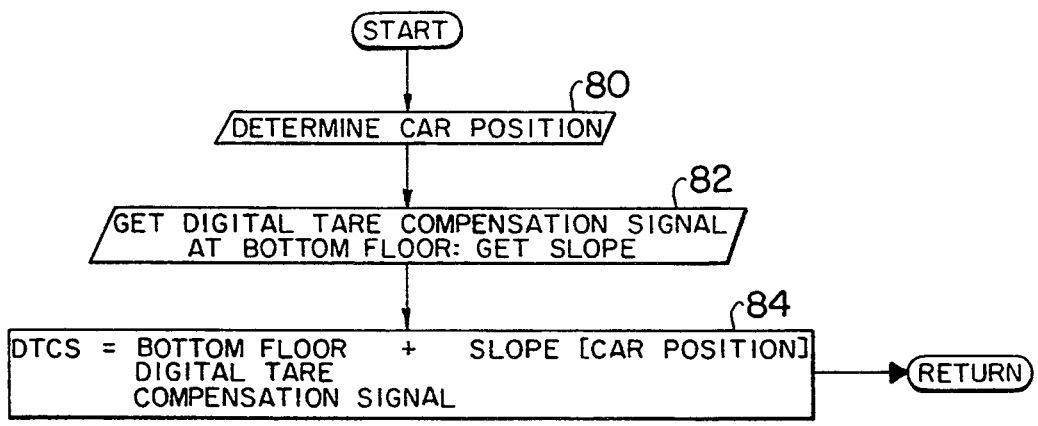
FIG. 4 is a logic diagram for compensating tare according to the rule described in FIG. 2.
Figure 5:
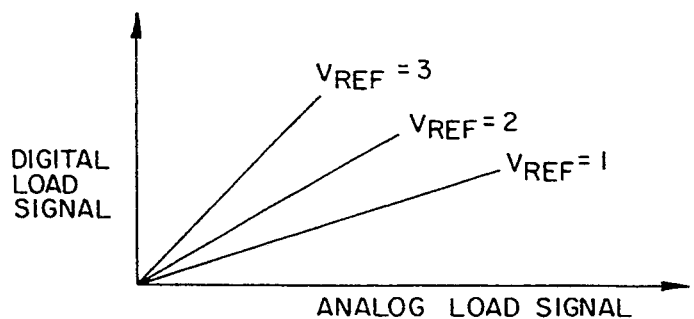
FIG. 5 shows various transfer functions, for an analog to digital converter (ADC) corresponding to various values of a reference voltage Vref

FIG. 1 shows car 2 in a hoistway 4. Hanging from the car 2 is a compensating rope 6. Power is supplied to the car 2 by a traveling cable 8. A load cell 10 provides an analog load signal (ALS) on a line 11 to a summer 12 where an analog tare compensation signal (ATCS), provided by a digital-to-analog converter (DAC) 14 on a line 16, is added so that the compensated load signal (CLS) is provided on line 18 to an analog to digital converter (ADC) 20. The ADC 20 provides a digital load signal (DLS) to a partial tare compensator 24, a remaining-tare subtractor 26, and a remaining-tare table 28. The partial tare compensator 24 makes a first pass at removing tare and partially eliminates it in the load signal prior to analog-to-digital (A to D) conversion in the ADC 20 while the remaining tare subtractor 26 makes a second pass, eliminating tare remaining after A to D conversion. The partial tare compensator 24 is responsive to the DIS and a car position signal, provided by a hoistway position means 29, and provides a digital tare compensation signal (DTCS) to the DAC 14. The remaining tare subtractor 26 is responsive to the position of the car 2, the DIS, a stored floor, and a digital stored load signal for providing a payload. The remaining tare table 28 is responsive to the digital load signal and car position and stores the digital load signal at every floor. The partial tare compensator 24 includes two blocks: "GET TARE COMPENSATION RULE" and "PARTIALLY COMPENSATE TARE" which are further shown in FIGS. 2, 4, respectively. Similarly, the remaining tare subtractor 26 includes two blocks "BUILD A TABLE" and "SUBTRACT REMAINING TARE" which are shown in the logic diagrams of FIGS. 8, 10, respectively. The routines of FIGS. 2, 4 constitute a first pass at compensating tare which yields a partial compensation of the tare. The routines of FIGS. 8, 10 constitute a second pass at compensating tare and subtract out the tare remaining after the routines of FIGS. 2, 4 are executed.

The partial tare compensator 24 and remaining tare subtractor 26 eliminate electronic offset inherent in the imperfections of the circuitry of the load weighing system. Electronic offset may be provided by the load cell 10 if it provides a non-zero analog load signal (ALS) when there is no load on it. Similarly, offset causes the summer 16 may provide a non-zero sum in response to zero-valued analog load and analog tare compensation signals (ARS, ATCS). The partial tare compensator 24 eliminates most of this electronic offset and the remaining tare subtractor 26 eliminates what offset remains.

The ADC 20 is responsive to an analog reference voltage Vref provided by a second DAC 30 itself responsive to a digital reference voltage Vdref. Vdref is provided by an original calibration section 22 in the computer 31. The computer 31 contains three software sections: original calibration section 32, a recalibration standard section 34, and a recalibration section 36. The purpose of the original calibration section 32 is to calibrate the load weighing system of FIG. 1 when the elevator car 2 is installed using a calibration weight 38 as the original standard by which to calibrate the load weighing system of FIG. 1. The purpose of the recalibration standard section 34 is to establish a standard by which to calibrate the load weighing system in the future, providing a future standard of recalibration. The purpose of the recalibration section 36 is to recalibrate the load weighing system of FIG. 1 using the future standard. The original calibration standard section 32, recalibration standard section 34 and recalibration standard section 36 are further described in FIGS. 9, 10 and 11, respectively.

Figure 2:
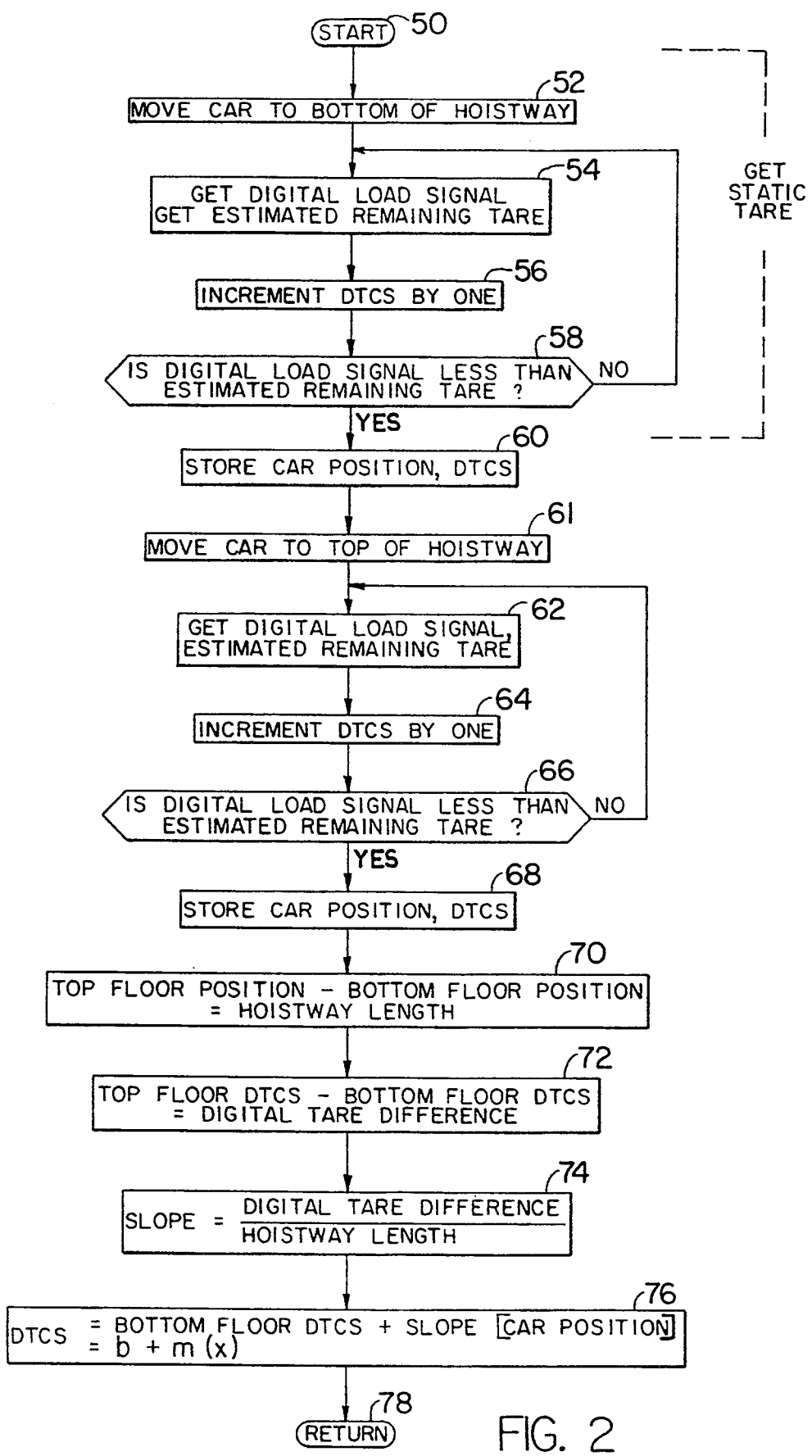
FIG. 2 is logic diagram for obtaining a rule for partially compensating tare.

FIG. 2 shows a logic diagram executable in a computer 31 of FIG. 1 in the block, "GET A TARE COMPENSATION RULE". Empirical studies have indicated that the relationship between dynamic tare and car position is linear. Therefore, the tare compensation rule is the equation for a line. Two points determine a line. A first hoistway run from the bottom floor to the top floor is made (FIG. 2) with a car 2 empty to get the tare at two points in the hoistway 4. Measuring the analog load signal at those two floors gives two load measurements at two positions and therefore two points. For the routines of FIGS. 2, 7, 10, and 11 the car 2 must be empty. For the routines of FIGS. 4, 9 the car 2 may run normally with passengers.

After START, step 50, the static tare, a y intercept for the line, is determined. This entails running an empty car 2 to the bottom of the hoistway 4, step 52, obtaining an estimated remaining tare and the digital load signal, step 54, and incrementing the DTCS by means of partial tare compensator 24 until the digital load signal from the ADC 20 is one bit less than the estimated remaining tare, steps 56, 58. Because car 2 is empty, the digital load signal indicates tare: (a) at the first floor, and prior to execution of the FIG. 4 routine, it indicates static tare, (b) elsewhere, and prior to execution of the FIG. 4 routine, it indicates dynamic tare, (c) after execution of the FIG. 4 routine, it indicates remaining tare. The estimated remaining tare is empirically obtained and approximates the absolute value of waveform B, FIG. 6.

A second point is needed to define the line. The car position at the bottom floor is measured in millimeters and the DTCS is stored, step 60. Next, the car is run to a second floor, at the top of the hoistway, step 61. The digital load signal and estimated remaining tare are obtained, step 62. The DTCS is incremented until the digital load signal is less than the estimated remaining tare, steps 64, 66. Car position and DTCS are stored, step 68.

Then, the bottom floor car position is subtracted from the top floor car position, step 70. The difference is the hoistway length. Next, the bottom floor DTCS is subtracted from the top floor DTCS and a digital tare difference is obtained thereby, step 72. Then, the digital tare difference is divided by the length, step 74. The quotient is a slope.

Figure 3:
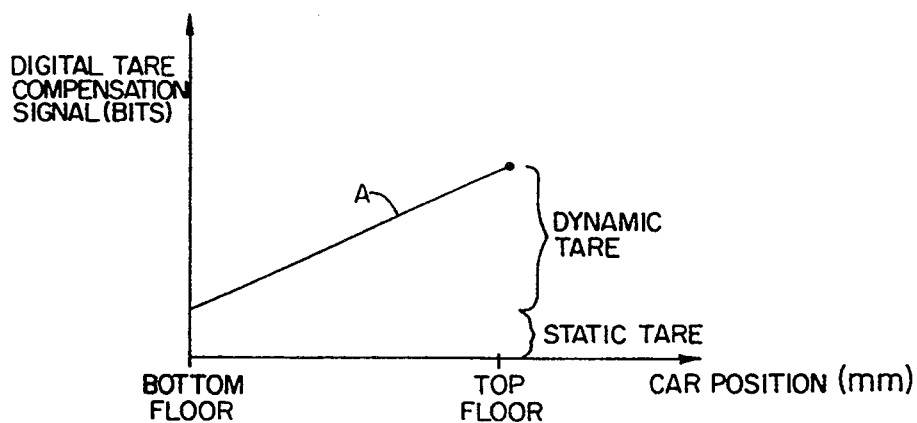
FIG. 3 is a graph of hoistway position versus tare.

FIG. 3 shows tare plotted as a function of car position. The slope, multiplied by car position, plus the DTCS for the static tare, gives the Tare Compensation Rule: the equation of waveform A of FIGS. 3, 6, step 76. And START is returned to, step 78.

Figure 7:
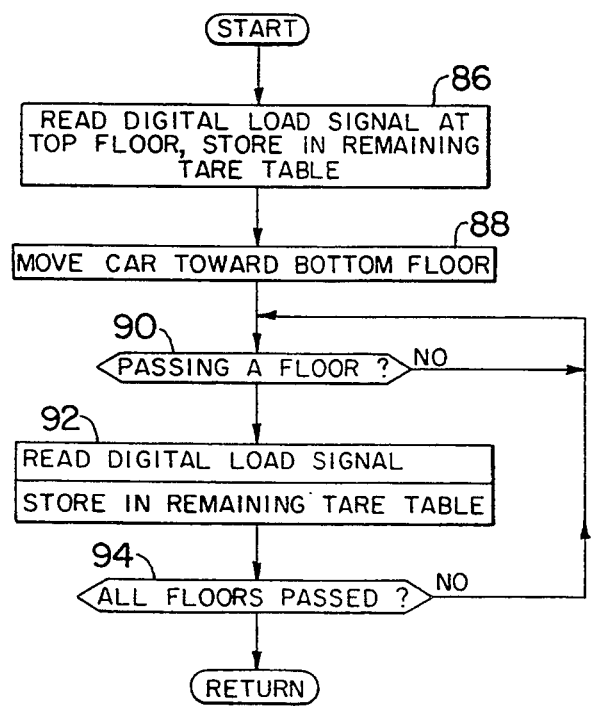
FIG. 7 is a logic diagram for building a remaining tare table.

A second logic diagram, "PARTIALLY COMPENSATE TARE (FIG. 7)", in FIG. 4 starts running when the car 2 is at the top of the hoistway 4; the FIG. 4 logic diagram of FIG. 4 uses the results of the execution of the logic diagram of FIG. 2 and requires determining car position, step 80, determining the DTCS at the bottom floor, determining the slope, step 82, and plugging those values into the rule to obtain DTCS, step 84, and START (FIG. 2) is returned to. DTCS is continuously provided by the partial tare compensator 24 (FIG. 1) as the car 2 (FIG. 1) travels up and down in the hoistway 4 (FIG. 4) and an analog tare compensation signal on line 16 (FIG. 1) is subtracted from the analog load signal provided on line 11 (FIG. 1) at the summer 12 (FIG. 7).

If the car 2 is empty and runs from the bottom to the top again while tare is compensated according to the above rule, tare is compensated but only in discontinuous increments rather than smoothly; tare remains uncompensated between DTCS increments, in the event car 2 is going up, or decrements, in the event car 2 is going down. A graph of tare as a function of car position is shown as waveform B in FIG. 6. Waveform A from FIG. 3 is also shown. As can be seen at the first floor, after the partial tare compensator 24 has made a first pass at compensating tare, the digital load signal, which is indicative of tare, has a non-zero value for a given DTCS. See point "a" of waveform A. As (empty) car 2 ascends and the rule for compensating tare is followed, DTCS is incremented, and the empty car digital load signal returns to zero (for example, between floors 1 and 2). Thereafter, and until DTCS is next incremented, the tare is only partially compensated.

Between DTCS increments and decrements, the slopes of waveforms A and B are the same. The empty car digital load signal values "a",b,c,d,e,f,g are the ordinate values for the points "a",b,c,d,e,f,g on waveform B at a floor.

Figure 6:
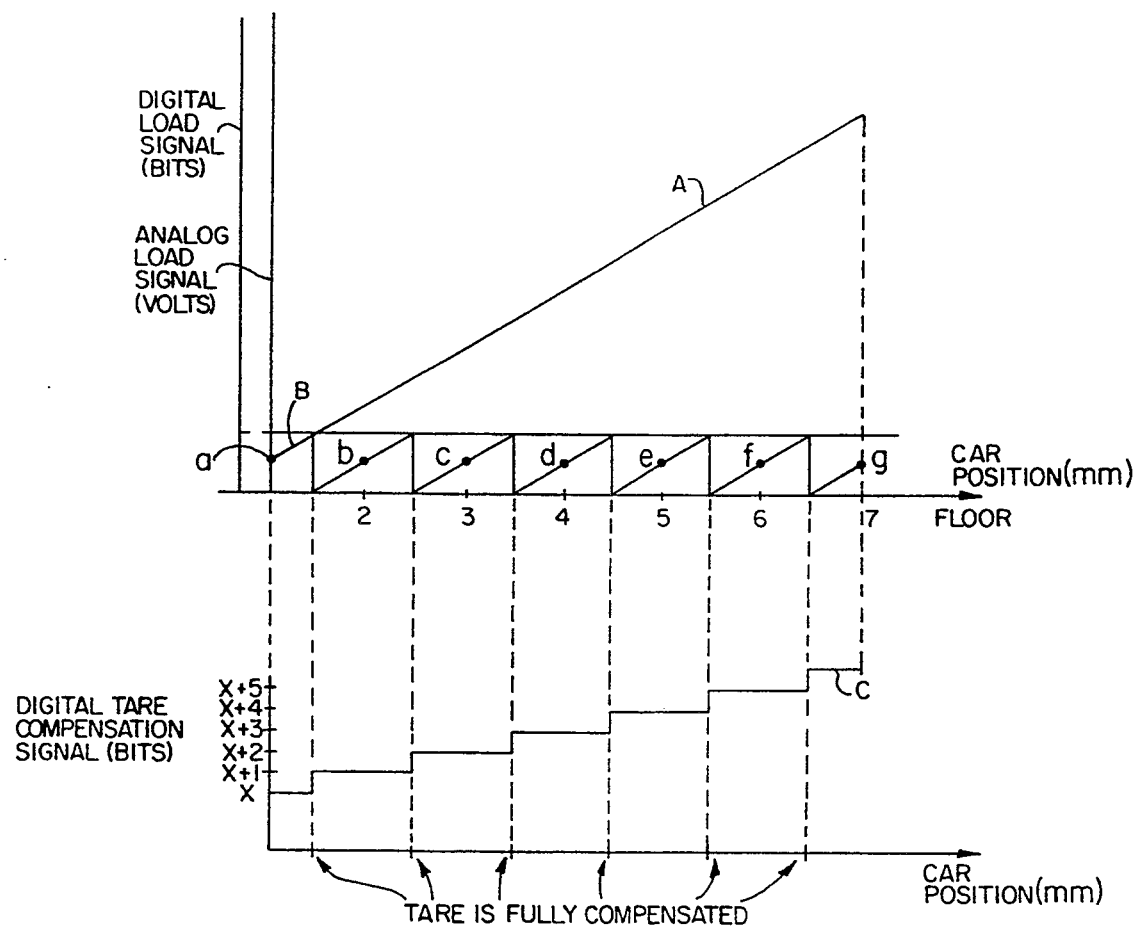
FIG. 6 is a graph of floor position versus analog load signal and digital load signal, and on the same time line floor position versus digital tare compensation signal (DTCS)

FIG. 6 shows DTCS as a function of floor position. DTCS is waveform C. X is the value of DTCS at the first floor. Tare is fully compensated only at the instant of ("TARE IS FULLY COMPENSATED") incrementing or decrementing DTCS.

It is desired to compensate fully, rather than partially, the tare at the floors—where passengers enter and leave and where load weight accuracy is most important. The way to do this is to find out the tare remaining after the partial tare compensator 24 has done its work during a second hoistway run, then, during normal operation, subtracting that remaining tare from the digital load signal. FIG. 7 shows a routine for acquisition of the remaining tare at each floor during an empty car run from top floor to bottom and storing it in a remaining tare table. FIG. 8 shows the remaining tare table. FIG. 9 charts a method for subtracting remaining tare, during normal operation, at each floor.

Step 86 of the FIG. 7 routine provides that to find out the tare which is remaining after operation of the partial tare compensator 24 (FIG. 1) with the routine of FIG. 4 running, the digital load signal at the top floor is stored in the remaining tare table. The empty car 2 moves from the top floor toward the bottom floor, step 88, and at each floor the digital load signal is read and stored in a remaining tare table, steps 90, 92. The points ab,c,d,e,f,g of FIG. 6 are the points at which the digital load signal is measured. After the remaining tare table is complete, step 94 (FIG. 7), during normal operation, the digital load signal is read from the remaining tare table, step 96 (FIG. 9), at a floor, step 98, and the digital stored load signal corresponding to that floor is read and the payload calculated as the difference between the digital load signal and the digital stored load signal. In step 104, car 2 may then be moved in response to the payload signal. Then START (FIG. 2) is returned to.

Thus, the ADC 20 dynamic range requirements for hitch load weighing are reduced by providing tare compensation as a function of hoistway position. Tare remaining after correction by the routine of FIG. 4 is eliminated by measuring it (FIG. 7) and subtracting it out of the digital load signal (FIG. 9).

Calibration

Now that tare in the load weight is being fully compensated, the load weighing system must be calibrated.

Figure 10:
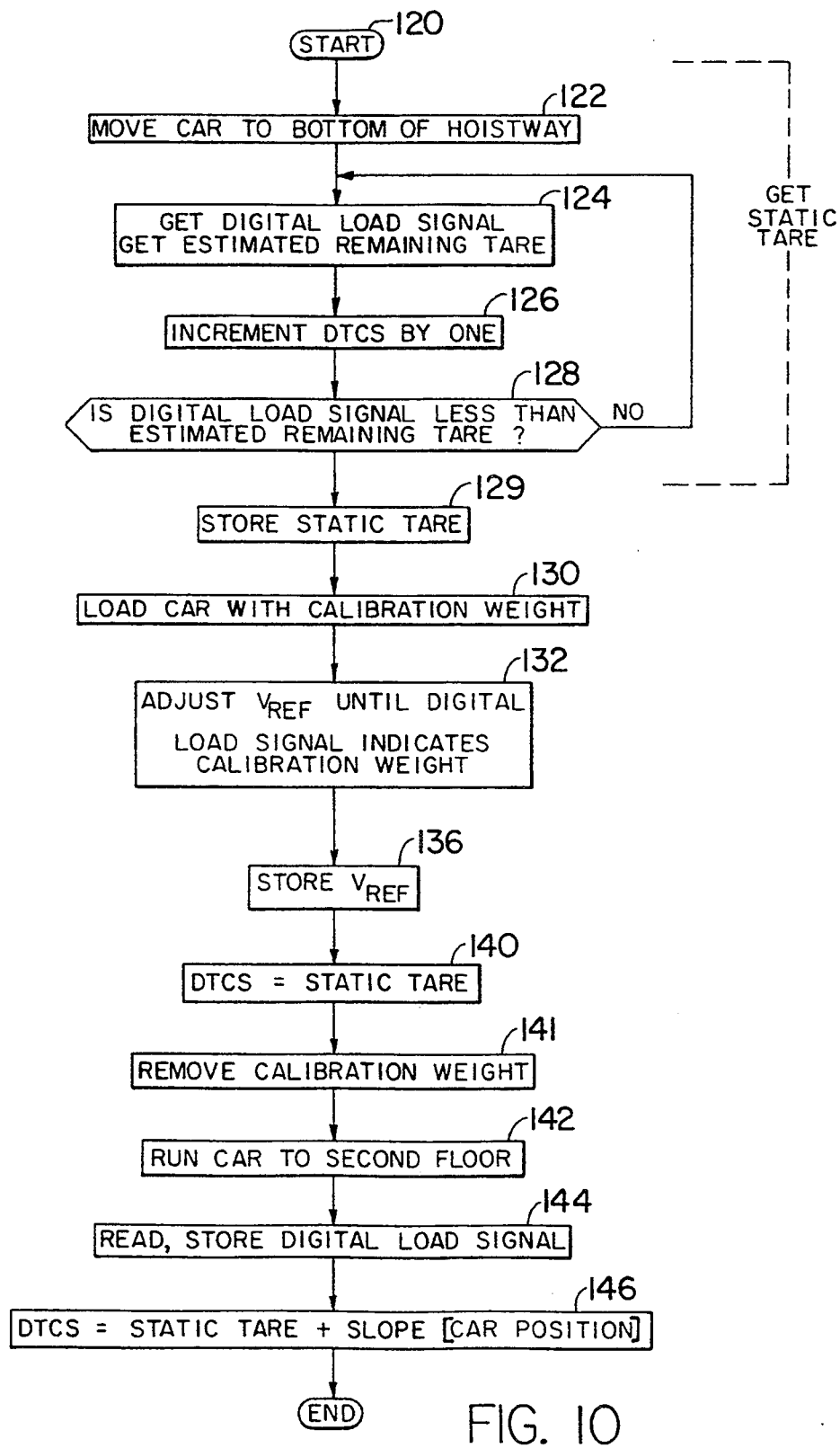
FIG. 10 shows a flow chart for calibration of the load weighing system of FIG. 1 and obtaining a recalibration standard for recalibration of the load weighing system of FIG. 1.

FIG. 10 shows the software of the original calibration section 32. After START, step 120, the static tare, is determined. This entails running car 2 while empty to the bottom of the hoistway 4, step 122, obtaining an estimated remaining tare and the digital load signal, step 124, and incrementing the DTCS via partial tare compensator 24 until the digital load signal from the ADC 20 is one bit less than the estimated remaining tare, steps 126, 128. Static tare is stored, step 129. Next, step 130, the car 2 is manually loaded with a calibration weight for calibrating the load weighing system of FIG. 1. Then, step 132, the Vref is adjusted until the digital load signal indicates the amount of weight in the car 2. A person can do step 132 by connecting the digital load signal to a digital display, comparing the digital load signal to a correct digital load signal, and incrementing a digital form of the reference voltage Vdref until the digital load signal indicates the calibration weight. The correct digital load signal read from the display is 127% of the maximum payload, in pounds for example, divided by the total number of ADC bits multiplied by the calibration weight (pounds). Vref is stored, step 136, for use in determining the recalibration standard, i.e., the dynamic tare result.

Following step 136, a standard for future calibration is obtained through steps 140–146. The goal in this recalibration scheme is to use the weight of the hoist ropes and traveling cable and other elements which make up the dynamic tare as the recalibration standard. Therefore, in step 140, DTCS is defined as the static tare, rather than as defined in step 84 (FIG. 4). Next, the car 2 is emptied of the calibration weights, step 141, and run to a second floor, at the top of the hoistway, step 142. The digital load signal is read and stored to be used as a recalibration standard, step 144. In step 146, the DTCS is again defined as in step 84 (FIG. 1). Now, the dynamic tare is available for use as a recalibration standard.

The routine of FIG. 11 is executed when the load weighing system of FIG. 1 needs to be recalibrated. The need for this may be indicated by roll back or roll forward. After a START, step 148 the static tare is obtained with the elevator car 2 empty, step 150, as explained in FIGS. 2, 10. Then, because the weight of the hoist ropes and traveling cable and other elements which make up the dynamic tare is to be used as the recalibration standard DTCS is defined as the static tare. In step 152, the empty elevator car 2 is run to the same floor as in step 142 of FIG. 10. Then, the Vref is adjusted until it is equal to the value of the digital load signal stored at step 144 of FIG. 10, step 156. Vref is stored for application to the ADC 20, step 158, and DTCS is again defined as in step 84 (FIG. 4).

The load weighing system at this point has been recalibrated without the use of a calibration weight. The routine of FIG. 11 may be reentered each time the load weighing system of FIG. 1 needs to be recalibrated.

Whereas the steps of FIG. 10 are taken separately from those in FIG. 2, they could be taken at the same time as those in FIG. 2. For example, the routine of FIG. 2 could accomplish all that is accomplished in the routines of FIG. 10 and FIG. 2 together if (a) after step 61 of FIG. 2, the car is loaded with calibration weights and Vref adjusted until the digital load signal indicates the calibration weight and that Vref is stored, and the calibration weights are then removed and (b) after step 66 the value of the digital load signal is stored for use as a recalibration standard.

It should be understood by those skilled in the art that various changes, omissions, and additions may be made herein without departing from the spirit and scope of the invention.

I claim:

1. A method of moving an elevator car, comprising the steps:
    a) providing an analog load signal indicative of weight on a car hitch;
    b) providing an analog tare compensation signal;
    c) providing a compensated analog load signal in response to a difference between said analog tare compensation signal and said analog load signal;
    d) converting said compensated analog load signal into a digital load signal;
    e) providing a digital stored load signal in response to said digital load signal;
    f) providing a payload signal in response to a difference between said digital stored load signal and said digital load signal; and g) moving an elevator car in response to said payload signal.

2. The method of claim 1, wherein said step of providing a digital stored load signal includes:
moving said empty elevator from one end of said hoistway to another in response to said analog tare compensation signal; and
measuring a magnitude of said digital load signal at each floor in said hoistway and storing said digital load signal in a remaining tare table and providing a digital stored load signal whose value comes from the remaining tare table.

3. A method of compensation tare in an elevator load weight signal, comprising the steps of:
providing an analog load signal indicative of weight on a car hitch;
providing an analog tare compensation signal wherein said step of providing an analog tare compensation signal includes:
measuring a static tare;
providing a slope describing a relationship between elevator position and tare;
multiplying said slope by said static tare for providing a product; and
summing said product with said elevator position for providing said analog tare compensation signal; and
providing a compensated analog load signal in response to a difference between said analog tare compensation signal and said analog load signal.

4. The method of claim 3, further comprising:
converting said compensated analog load signal into a digital load signal;
providing a digital stored load signal;
providing a payload signal in response to a difference between said digital stored load signal from said digital load signal.

5. A method of compensating tare in an elevator load weight signal, comprising the steps of:
providing an analog load signal indicative of weight on a car hitch;
providing an analog tare compensation signal including:
measuring a static tare;
obtaining a slope describing a linear relationship between elevator position and tare including:
moving an empty car to a first floor of a hoistway;
measuring said digital load signal;
comparing said digital load signal with an estimated remaining tare and adjusting a magnitude of a digital tare compensation signal until a magnitude of said digital load signal is less than said estimated remaining tare;
measuring and storing a first floor digital tare compensation signal;
moving said empty elevator to a second floor in said hoistway;
measuring said digital load signal while said car is at a top of said hoistway;
comparing said digital load signal with an estimated remaining tare and adjusting the magnitude of a digital tare compensation signal until the magnitude of said digital load signal is less than said estimated remaining tare while the car is at the top of said hoistway;
measuring and storing a second floor digital tare compensation signal; and
dividing a hoistway length by a difference between said first floor digital tare compensation signal and said second floor digital tare compensation signal;
multiplying said slope by said elevator position for obtaining a product;
summing said product with said elevator position for providing said analog tare compensation signal; and
providing a compensated analog load signal in response to a difference between said analog tare compensation signal and said analog load signal.

6. A method of compensating tare in an elevator load weight signal, comprising the steps of:
providing an analog load signal indicative of weight on a car hitch;
providing an analog tare compensation signal; and
providing a compensated analog load signal in response to a difference between said analog tare compensation signal and said analog load signal;
converting said compensated analog load signal into a digital load signal;
providing a digital stored load signal including:
moving said empty elevator from one end of said hoistway to another in response to said analog tare compensation signal; and
measuring a magnitude of said digital load signal at each floor in said hoistway and storing said digital load signal in a remaining tare table and providing a digital stored load signal whose value comes from the remaining tare table;
providing a payload signal in response to a difference between said digital stored load signal from said digital load signal.

7. An elevator load weighing apparatus, comprising:
a summer, responsive to an analog load signal indicative of weight on a car hitch and an analog tare compensation signal, which provides a compensated load signal;
an analog-to-digital converter, responsive to said compensated load signal, which provides a digital load signal;
a tare compensator, responsive to said digital load signal and an elevator position signal, which provides a digital tare compensation signal; and
a digital-to-analog converter, responsive to said digital tare compensation signal, which provides an analog tare compensation signal.

8. The elevator load weighing apparatus of claim 7, further comprising:
a remaining-tare table, which stores said digital load signal and said elevator position signal at each floor; and
a remaining tare subtractor, responsive to said digital stored signal and said stored elevator position and an elevator position signal, which subtracts said digital stored signal from said digital signal at each floor.

9. The elevator load weighing apparatus of claim 7, wherein said digital tare compensation signal depends linearly on elevator position.

* * * * *